United States Patent
Nishimura

(10) Patent No.: US 6,298,717 B1
(45) Date of Patent: Oct. 9, 2001

(54) DEVICE FOR DETECTING THE MISFIRE IN AN INTERNAL COMBUSTION ENGINE

(75) Inventor: Yukinobu Nishimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/322,002

(22) Filed: May 28, 1999

(30) Foreign Application Priority Data

Feb. 18, 1999 (JP) .................................................. 11-039688

(51) Int. Cl.[7] ...................................................... G01L 3/26
(52) U.S. Cl. .......................................... 73/117.3; 73/35.08
(58) Field of Search ................................ 73/35.03–35.08, 73/117.3, 115, 116; 123/425, 406.27, 436; 701/101, 102, 110

(56) References Cited

U.S. PATENT DOCUMENTS

| Re. 34,234 | * | 4/1993 | Kuroiwa et al. | 73/35 |
| 4,716,874 | * | 1/1988 | Hilliard et al. | 123/425 |
| 5,207,200 | * | 5/1993 | Iwata | 73/35 |
| 5,638,278 | * | 6/1997 | Nishimura et al. | 73/117.3 |

* cited by examiner

Primary Examiner—Benjamin R. Fuller
Assistant Examiner—Maurice Stevens
(74) Attorney, Agent, or Firm—Sughrue, Mion, Zinn, Macpeak & Seas, PLLC

(57) ABSTRACT

A device for detecting the misfire in an internal combustion engine which features improved reliability for judging the misfire in all operation regions by using either the revolution data or the ionic current depending upon the operation region. The device comprises various sensors 1 and 2 for detecting the operation conditions Ne and Qa of the internal combustion engine, an operation region detection means 12 for detecting the operation region R from the operation conditions, a control parameter operation means 11 for operating control parameters J, P based upon the operation conditions, an ignition device 4 for igniting the internal combustion engine relying upon the control parameters, an ionic current detection unit 5 for detecting an ionic current generated upon the ignition, a first misfire judging means 15 for judging the misfire in the internal combustion engine based upon a change in the time of the revolution data Ne, a second misfire judging means 16 for judging the misfire based upon the ionic current, and a misfire judgement selection means 17 for selectively using the first misfire judging means or the second misfire judging means depending upon the operation region.

11 Claims, 6 Drawing Sheets

DEVICE FOR DETECTING THE MISFIRE IN AN INTERNAL COMBUSTION ENGINE

BACKGROUND OF THE INVENTION

1. Field of the Invention

The present invention relates to a device for detecting the misfire in an internal combustion engine and, particularly, to a device for detecting the misfire in an internal combustion engine featuring improved reliability in all operation regions by detecting the misfire using either the revolution data or the ionic current depending upon the operation region.

2. Prior Art

A device for detecting the misfire in an internal combustion engine relying on a change in the pulse period ratio: as revolution data, has heretofore been well known as disclosed in, for example, Japanese Unexamined Patent Publication (Kowai) No. 79396/1993 (Japanese Patent No. 2606019).

There has also been known a device for detecting the misfire in an internal combustion engine relying on the detection levee of an ionic current as disclosed in, for example, Japanese Unexamined Patent Publication (Kokai) No. 26090/1993 (Japanese Patent No. 2657012).

However, no device for detecting the misfire based on both the revolution data and the ionic current has yet been proposed.

It has generally been known that the reliability (S/N ratio) for detecting the misfire based on the revolution data and the ionic current, varies depending upon the operation region (rotational speed) of the internal combustion engine.

FIGS. 6 and 7 are diagrams of characteristics showing the reliability (S/N ratio) for detecting the period ratio and the ionic current relative to the rotational speed Ne [rpm] of the engine.

Referring to FIG. 6, the reliability for judging the misfire based on the period ratio (revolution data) deteriorates with an increase in the rotational speed Ne of the engine.

This is because, the rotational pulse period and the amount of change thereof decrease with an increase in the rotational speed Ne of the engine, and it becomes difficult to detect a change in the period ratio.

Here, it is not desirable to operate a period ratio within a short pulse section in a high-speed operation region, since the load to the computer (ECU) increases.

Referring to FIG. 7, furthermore, the reliability for judging the misfire based on the ionic current deteriorates with a decrease in the rotational speed Ne of the engine, and particularly deteriorates near the idling rotational speed (700 rpm) as indicated by a broken line.

This is because, in the idling operation region, the level for detecting the ionic current loses stability since the load exerted on the engine and the rotational speed of the engine vary to a great extent. Furthermore, the level for detecting the ionic current temporarily drops depending upon the fouling of the spark plugs and the properties of the fuel.

According to the conventional devices for detecting the misfire in the internal combustion engines as described above, the reliability is deteriorated during the high-speed operation when the period ratio (revolution data) is relied upon and the reliability is deteriorated during the low-speed operation when the ionic current is relied upon.

SUMMARY OF THE INVENTION

The present invention was accomplished in order to solve the above-mentioned problems, and its object is to provide a device for detecting the misfire in an internal combustion engine which features improved reliability for judging the misfire in all operation regions by using either the revolution data or the ionic current depending upon the operation region.

A device for detecting the misfire in an internal combustion engine according to the present invention comprises:

various sensors for detecting the operation conditions of the internal combustion engine;

an operation region detection means for detecting the operation region of the internal combustion engine from the operation conditions;

a control parameter operation means for operating control parameters of the internal combustion engine based upon the operation conditions;

an ignition device for igniting the internal combustion engine relying upon the control parameters;

an ionic current detection unit for detecting an ionic current generated upon the ignition of the internal combustion engine;

a first misfire judging means for judging the misfire in the internal combustion engine based upon a change in the time of the revolution data of the internal combustion engine included in the operation conditions;

a second misfire judging means for judging the misfire in the internal combustion engine based upon the ionic current; and a misfire judgement selection means for selectively using the first misfire judging means or the second misfire judging means depending upon the operation region.

In the device for detecting the misfire in an internal combustion engine of the present invention, the operation region detection means detects at least the operation regions divided into a plurality of regions based upon the revolution data of the internal combustion engine.

In the device for detecting the misfire in an internal combustion engine of the present invention, the operation region detection means detects a first operation region where the rotational speed is lower than a first predetermined rotational speed corresponding to the idling rotational speed of the internal combustion engine, and the misfire judgement selection means uses the first misfire judging means in the first operation region.

In the device for detecting the misfire in an internal combustion engine of the present invention, the operation region detection means detects a second operation region where the rotational speed is higher than a second predetermined rotational speed which is higher than the first predetermined rotational speed, and the misfire judgement selection means uses the second misfire judging means in the second operation region.

In the device for detecting the misfire in an internal combustion engine of the present invention, the operation region detection means detects a third operation region lying between the first predetermined rotational speed corresponding to the idling rotational speed of the internal combustion engine and the second predetermined rotational speed higher than the first predetermined rotational speed, the misfire judgement selection means includes an ionic current condition judging means for judging whether the ionic current is in a proper condition or not in the third operation region, and uses the second misfire judging means in the second operation region when it is judged that the ionic current is in the proper condition in the third operation region, and uses the first misfire judging means in the second operation region when it is judged that the ionic current is not in the proper condition in the third operation region.

In the device for detecting the misfire in an internal combustion engine of the present invention, the misfire judgement selection means uses the first misfire judging means in the third operation region.

In the device for detecting the misfire in an internal combustion engine of the present invention, the misfire judgement selection means uses the second misfire judging means when it is judged that the ionic current is in the proper condition in the third operation region, and uses the first misfire judging means when it is judged that the ionic current is not in the proper condition in the third operation region.

In the device for detecting the misfire in an internal combustion engine of the present invention, the ionic current condition judging means so judges that the ionic current is not in the proper condition when a peak level of the ionic current detected in the third operation region is lower than a predetermined value.

In the device for detecting the misfire in an internal combustion engine of the present invention, the ionic current condition judging means so judges that the ionic current is not in the proper condition when an integrated value of the ionic current detected in the third operation region is smaller than a predetermined value.

In the device for detecting the misfire in an internal combustion engine of the present invention, the ionic current condition judging means so judges that the ionic current is not in the proper condition when the results of judgement by the first and second misfire judging means in the third operation region are not in agreement with each other.

In the device for detecting the misfire in an internal combustion engine of the present invention, the ionic current condition judging means so judges that the ionic current is not in the proper condition when the first misfire judging means renders the judgement of misfire in the third operation region but when the second misfire judging means does not render the judgement of misfire in the third operation region.

DESCRIPTION OF THE PREFERRED EMBODIMENTS

Embodiment 1.

An embodiment 1 of the present invention will now be described with reference to the drawings.

Figure 1:
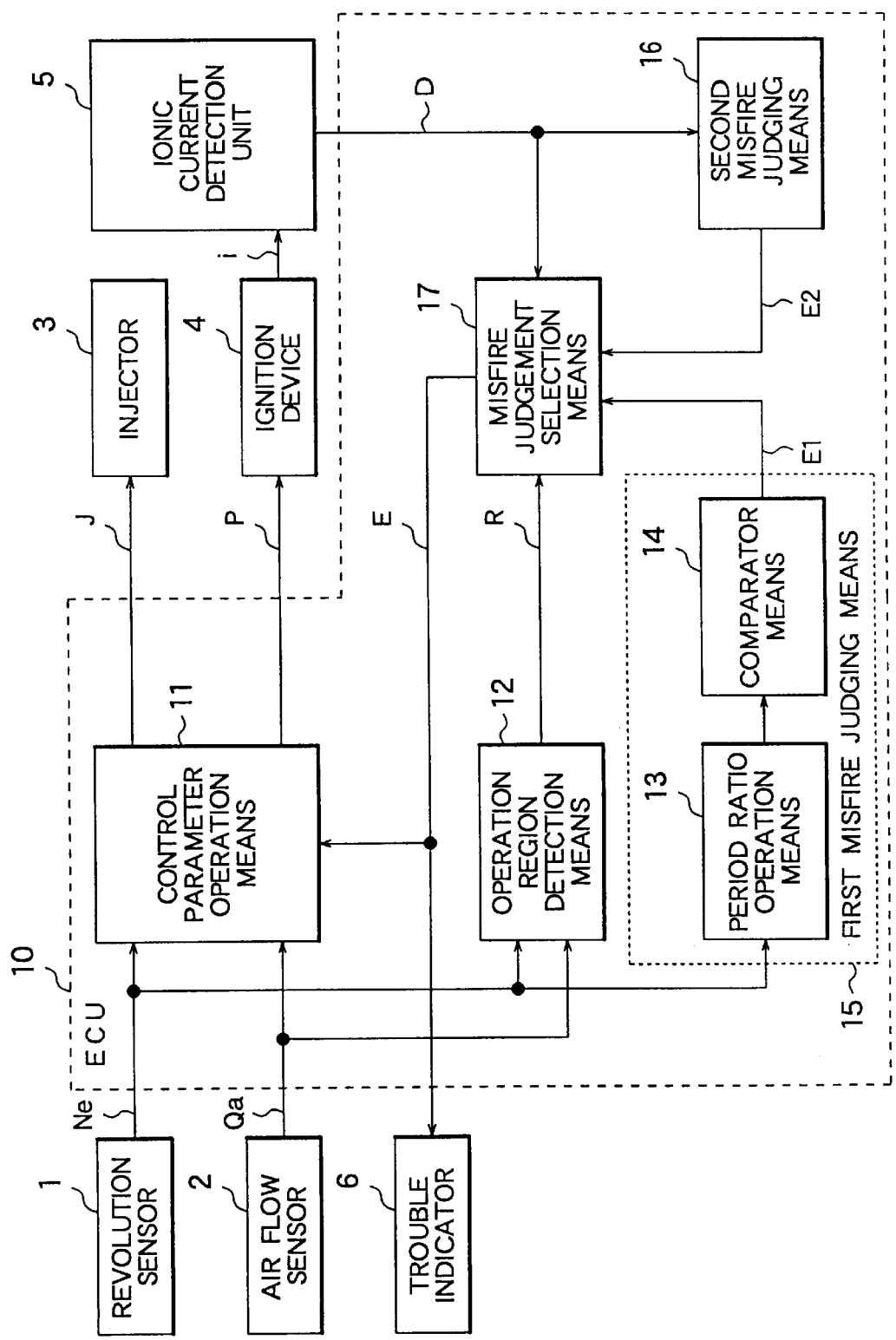
FIG. 1 is a functional block diagram illustrating an embodiment 1 of the present invention.
Figure 2:
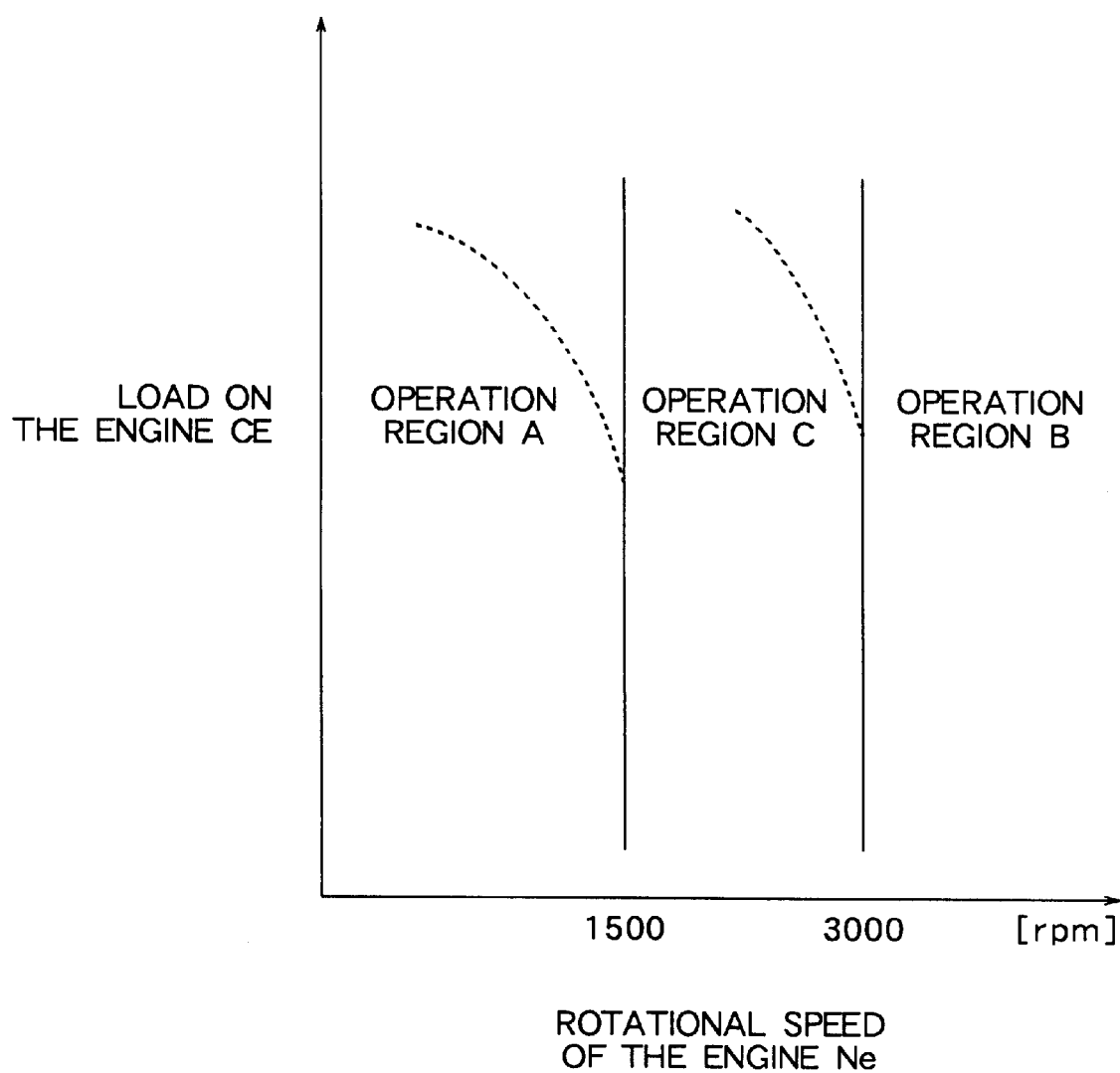
FIG. 2 is a diagram illustrating the operation regions divided according to the embodiment 1 of the present invention.
Figure 3:
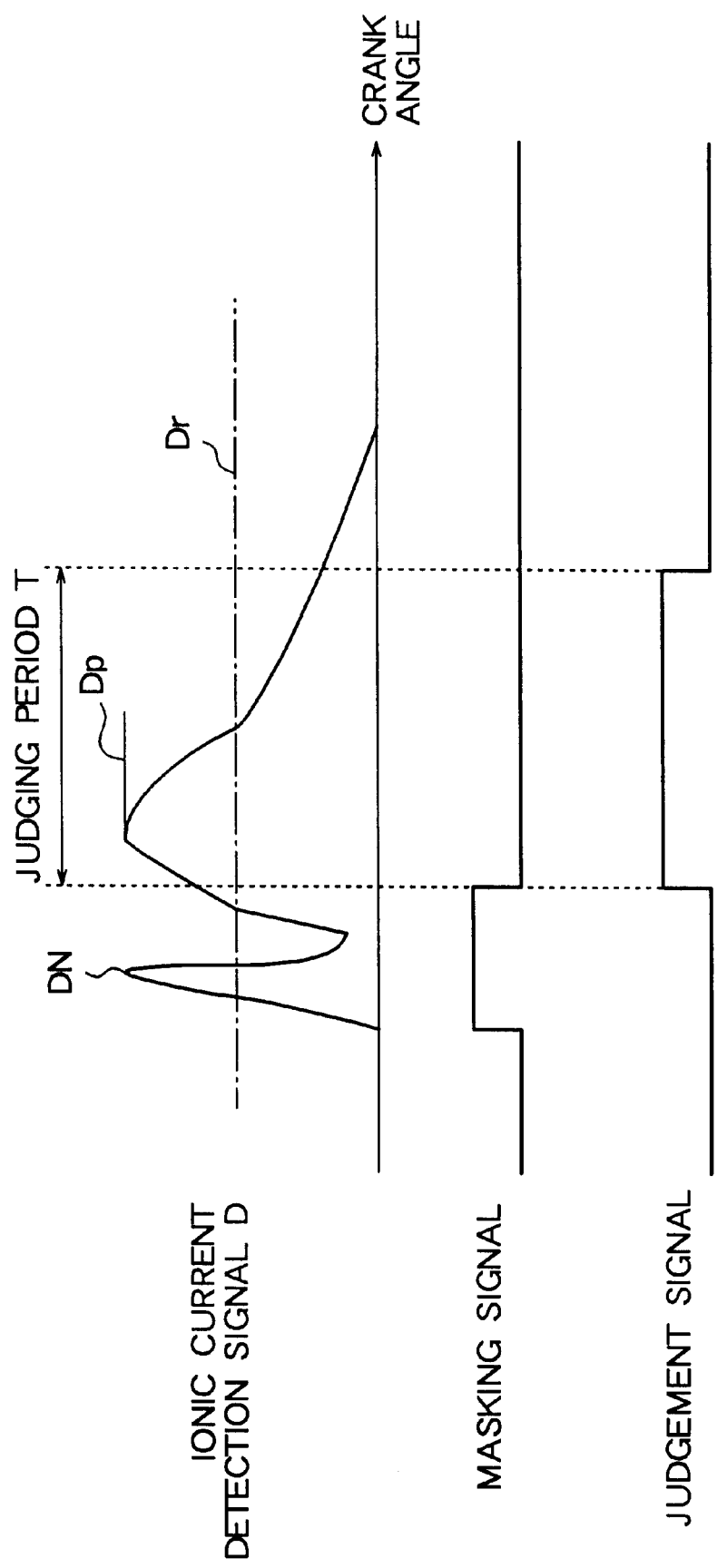
FIG. 3 is a diagram of waveforms illustrating the operation for judging the ionic current condition according to the embodiment 1 of the present invention.

FIG. 1 is a functional block diagram illustrating the embodiment 1 of the present invention, FIG. 2 is a diagram illustrating the operation regions detected by an operation region detection means of FIG. 1, and FIG. 3 is a diagram of waveforms illustrating the operation of an ionic current condition judging means included in the misfire judgement selection means of FIG. 1.

In FIG. 1, an engine (not shown) is equipped with various sensors 1, 2 for detecting the operation conditions, and actuators 3, 4 for driving the engine.

Here, only a revolution sensor 1 and an air flow sensor 2 are shown as various sensors. In practice, however, there are provided a throttle opening-degree sensor, a cooling water temperature sensor and the like sensors as various other sensors that are not shown.

As is well known, the revolution sensor 1 produces pulse signals corresponding to the rotational speed (revolution data) Ne of the engine. The pulse signals have edges corresponding to reference crank angles of a plurality of cylinders of the engine, and the reference crank angles are used for operating the control timing of the engine.

The air flow sensor 2 produces a voltage signal corresponding to an amount Qa of the air taken in by the engine.

There are shown an injector 3 for injecting the fuel and an ignition device 4 for controlling the ignition, as actuators for driving the engine. In practice, however, there are provided an ISC valve actuator in the by-path of an intake pipe and the like actuators as other actuators that are not shown.

The ignition device 4 is equipped with an ionic current detection unit 5 which produces an ionic current detection signal D upon detecting an ionic current i that generates at the time of ignition.

An ECU (electronic control unit) 10 comprising a microcomputer receives sensor signals representing, for example, the rotational speed Ne of the engine and the amount Qa of the air that is taken in as operation conditions of the engine, receives the ionic current detection signal D, executes the misfire judgement (described later), and sends the result as a misfire judgement signal E to a trouble indicator 6. The ECU 10 further produces a fuel injection signal J for the injector 3 and an ignition signal P for the ignition device 4.

The ECU 10 comprises a control parameter operation means 11 and an operation region detection means 12 that receive the rotational speed Ne of the engine and the amount Qa of the air that is taken in, a first misfire judging means 15 that includes a period ratio operation means 13 and a comparator d means 14 and receives the rotational speed Ne of the engine, a second misfire judging means 16 that receives the ionic current detection signal D, and a misfire judgement selection means 17 that receives the results of judgement from the misfire judging means 15 and 16.

The control parameter operation means 11 operates control parameters (fuel injection signal J, ignition signal P, etc.) for the engine based upon the operation conditions (rotational speed Ne of the engine, amount Qa of the air that is taken in, etc.). The fuel injection signal J and the ignition signal P are output as drive signals to the injector 3 and to the ignition device 4.

The operation region detection means 12 detects a plurality of operation regions A to C divided as shown in FIG. 2 from the rotational speed Ne of the engine and the like, and produces operation region detection signals R representing the operation regions A to C.

In FIG. 2, the abscissa represents the rotational speed Ne [rpm] of the engine and the ordinate represents the load CE exerted on the engine. The operation region A is that of low rotational speeds of not higher than 1500 rpm which corresponds to the idling rotational speed, the operation region B is that of high rotational speeds of not lower than 3000 (or 2500) rpm, and the operation region C is that of intermediate rotational speeds of from 1500 to 3000 rpm.

The operation regions A to C may be variably set depending upon the load CE exerted on the engine (amount Qa of the air that is taken in) as indicated by broken lines in FIG. 2.

The period ratio operation means in the first misfire judging means 15 successively measures the period of the edge (reference crank angle) of a pulse signal that represents the rotational speed Ne of the engine, operates the preceding and succeeding period ratios, and successively stores the changes in the time of the period ratio.

The comparator means 14 in the first misfire judging means 15 compares the change in the period ratio with a predetermined value, and produces a first misfire judgement signal E1 when a sudden reduction (misfire) is judged in the rotational speed Ne of the engine.

The second misfire judging means 16 judges the combustion state at the time of ignition from, for example, a peak level of the ionic current detection signal D or an integrated value of the ionic current detection signal D during a predetermined period of time after the ignition, renders the judgement of misfire in the engine when the peak level of the ionic current detection signal D or the integrated value thereof is smaller than a reference value, and produces a second misfire judgement signal E2.

The misfire judgement selection means 17 selectively uses the first misfire judging means 15 or the second misfire judging means 16 depending upon the operation region detection signal R, and sends either the first misfire judgement signal E1 or the second misfire judgement signal E2 as a final misfire judgement signal E to the control parameter operation means 11 and to the trouble indicator 6.

Depending upon the misfire judgement signal E, therefore, the control parameter operation means 11 corrects the output timings of the fuel injection signal J and the ignition signal P, so that the exhaust gases are not worsened and the engine is not damaged due to misfire.

Relying upon the misfire judgement signal E, furthermore, the trouble indicator 6 indicates the presence of trouble due to misfire.

Figure 6:
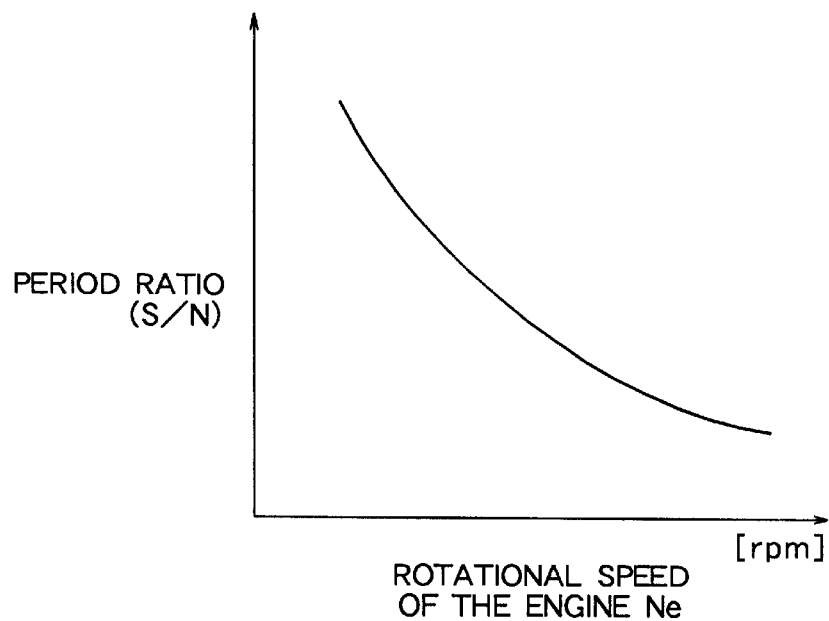
FIG. 6 is a diagram of characteristics showing a change in the reliability for judging the misfire based on a general revolution period ratio with respect to the rotational speed of the engine.
Figure 7:
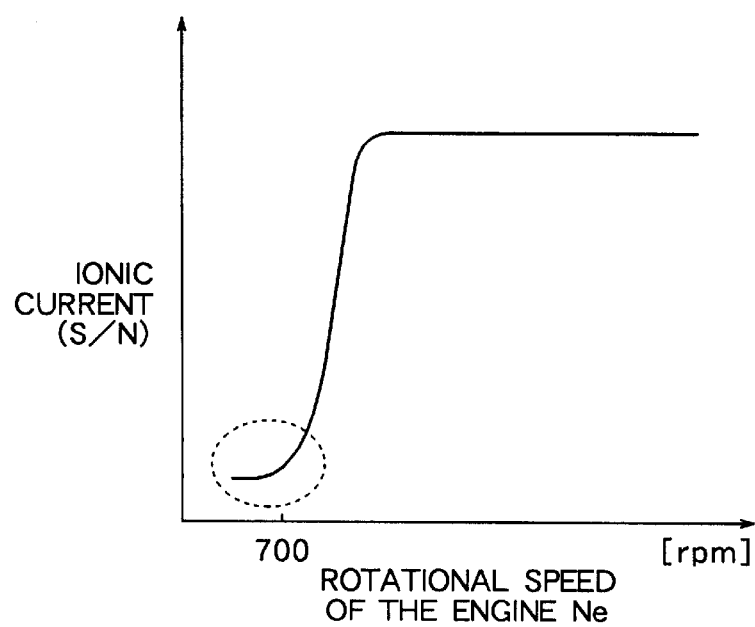
FIG. 7 is a diagram of characteristics showing a change in the reliability for judging the misfire based on a general ionic current with respect to the rotational speed of the engine.

When the operation region detection signal R represents the operation region A (region of low rotational speeds), the misfire judgement selection means 17 uses the first misfire judging means 15 based on the rotational speed Ne of the engine (see FIG. 6) which is highly reliable on the side of low rotational speeds, and produces the first misfire judgement signal E1 as a final misfire judgement signal E.

When the operation region detection signal R represents the operation region B (region of high rotational speeds), the misfire judgement selection means 17 uses the second misfire judging means 16 based on the ionic current which is highly reliable on the side of high rotational speeds, and produces the second misfire judgement signal E2 as a final misfire judgement signal E.

When the operation region detection signal R represents the operation region C (region of intermediate rotational speeds), furthermore, the misfire judgement selection means 17 includes an ionic current condition judging means (not shown) which judges whether the ionic current i is in a proper state in the operation region C, inhibits the use of the second misfire judging means 16 when it is so judged that the ionic current i is not in the proper condition and uses the first misfire judging means 15 even in the operation region B.

In this case, the misfire judgement selection means 17 uses the first misfire judging means 15 even in the operation region C.

When a peak level Dp of the ionic current detection signal D detected in the operation region C is smaller than a predetermined value Dr as shown in FIG. 3, the ionic current condition judging means in the misfire judgement selection means 17 judges the ionic current i to be not in the proper condition, and sets a flag F (F=1) to indicate that the ionic current is not in the proper condition.

At this moment, the peak level Dp is simply compared with the predetermined value Dr to relatively easily judge the improper condition of the ionic current i.

The condition of ionic current is judged in the operation region C because of the reason that in the operation region C, the waveform and level of the ionic current detection signal D remain relatively stable, which is suited for judging the improper condition.

The predetermined value Dr is set to be larger than a reference value for judging the misfire.

In FIG. 3, noise DN at the time of ignition is superposed on the ionic current detection signal D. In order to prevent erroneous detection of the ignition noise DN, therefore, the ionic current condition judging means masks the period just after the ignition with a masking signal, and detects the ionic current detection signal D relying on a judgement signal after the end of the masking signal to regard it as a judging period T.

Next, the operation of the embodiment 1 of the present invention shown in FIG. 1 will be described with reference to a flow chart of FIG. 4 together with FIGS. 2 and 3.

Figure 4:
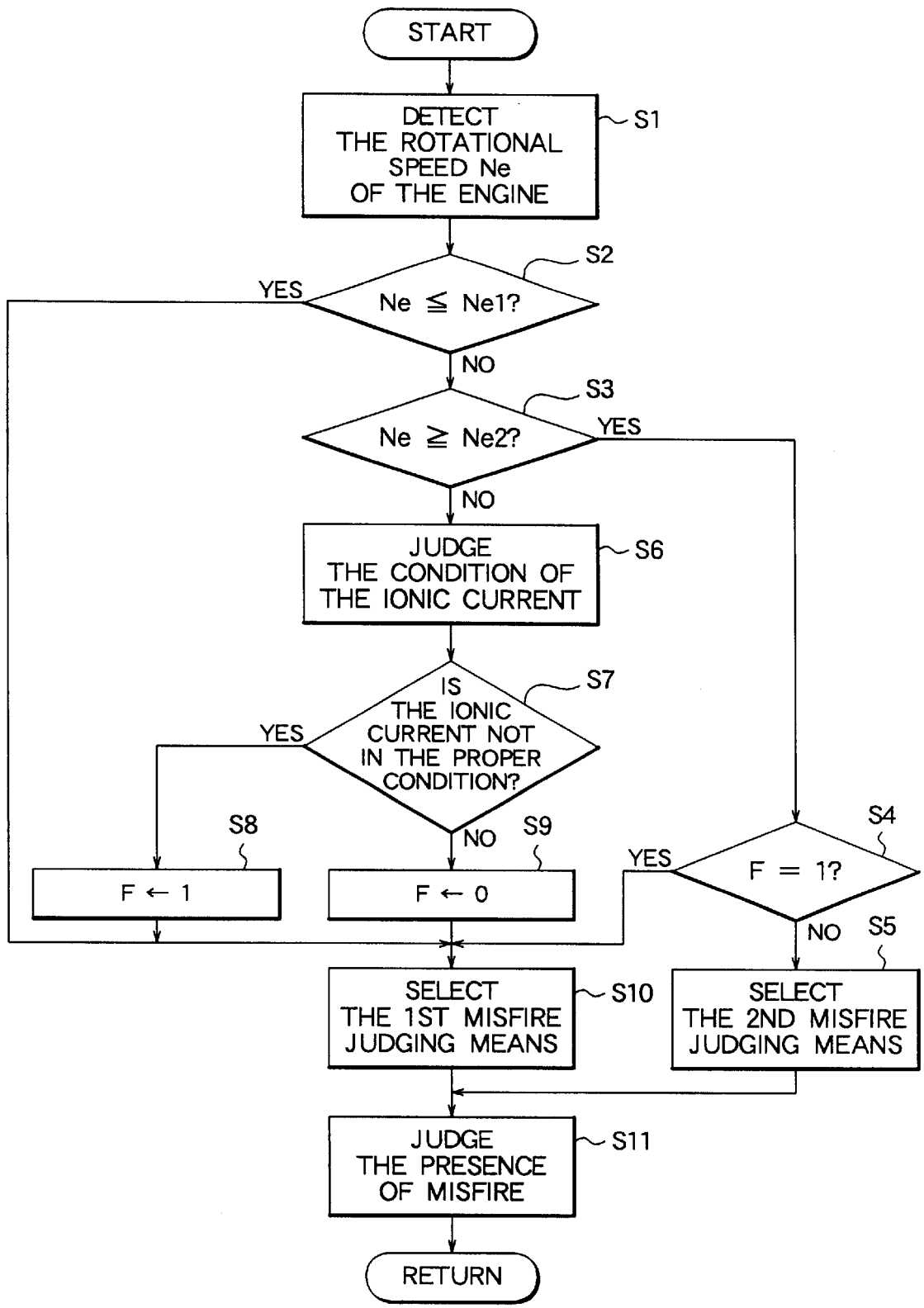
FIG. 4 is a flow chart illustrating the processing operation according to the embodiment 1 of the present invention.

FIG. 4 illustrates a processing operation by the operation region detection means 12 and by the misfire judgement selection means 17 in the ECU 10.

First, the operation region detection means 12 detects the rotational speed Ne of the engine based on the output signal of the revolution sensor 1 (step S1) and judges whether the rotational speed Ne of the engine is lower than a first predetermined rotational speed Ne1 (e.g., 1500 rpm) corresponding to the idling rotational speed (operation region A) or not (step S2).

When it is judged that Ne≦Ne1 (i.e., YES), the operation region detection means 12 produces an operation region detection signal R representing the operation region A.

In response to this, the misfire judgement selection means 17 selects the first misfire judging means 15 (step S10) which judges the presence of misfire by using the first misfire judgement signal E1 (step S11), whereby the processing of FIG. 4 ends and the routine returns.

When it is judged at the step S2 that Ne>Ne1 (i.e., NO), the operation region detection means 12 judges whether the rotational speed Ne of the engine is lower than a second predetermined rotational speed Ne2 (e.g., 3000 rpm) (operation region B) which is higher than the first predetermined rotational speed Ne1 or not (step S3).

When it is judged that Ne≧Ne2 (i.e., YES), the operation region detection means 12 produces an operation region detection signal R representing the operation region B.

In response to this, the misfire judgement selection means 17 judges whether the flag F representing the improper condition of the ionic current is "1" or not (step S4).

When it is judged that F=0 (i.e., NO), the ionic current i is in the proper condition, whereby the second misfire judging means 16 is selected (step S5), and the presence of misfire is judged by using the second misfire judgement signal E2 (step S11).

When it is judged at the step S4 that F=1 (i.e., YES), the misfire judgement selection means 17 inhibits the selection of the second misfire judging means 16 and selects the first misfire judging means 15 (step S10).

When it is judged at the step S3 that Ne<Ne2 (i.e., NO), the rotational speed Ne of the engine lies between the first predetermined rotational speed Ne1 and the second predetermined rotational speed Ne2. Therefore, the operation region detection means 12 produces an operation region detection signal R that represents the operation region C (intermediate rotational speed region).

In response to this, the ionic current condition judging means in the misfire judgement selection means 17 judges the condition of the ionic current i detected in the operation region C (step S6). That is, whether the ionic current i is in the proper condition or not is judged relying upon whether the peak level Dp of the ionic current detection signal D is lower than the predetermined value Dr or not.

When it is judged that Dp≦Dr (i.e., YES), the ionic current i is not in the proper condition. Therefore, the flag F is set to "1" (step S8) and the program proceeds to a step S10.

When it is judged at the step S7 that Dp>Dr (i.e., NO), the ionic current i is in the proper condition. Therefore, the flag F is cleared to "0" (step S9), and the program proceeds to the step S10. Accordingly, the condition of the ionic current in the operation region C is set to the flag F which is referred to at the step S4 in the operation region B.

As described above, the misfire judgement selection means 17 uses the first misfire judging means 15 based on the revolution data in the operation regions A and C, uses the second misfire judging means 16 in the operation region B when the ionic current is in the proper condition, and uses the first misfire judging means 15 when the ionic current is not in the proper condition in the operation region B.

Thus, it is allowed to detect the misfire maintaining high reliability in all of the operation regions A to C.

Despite the waveform and level of the ionic current detection signal D vary due to difference in the properties of the fuel and the ionic current i is not in the proper condition, use of the second misfire judging means 16 is inhibited in the operation region B and, instead, the first misfire judging means 15 is used to prevent erroneous detection of the misfire.

Embodiment 2.

In the above-mentioned embodiment 1, the first misfire judging means 15 was used in the operation region C. When the ionic current is in the proper condition, however, it is allowable to use the second misfire judging means 16 in the operation region C, too.

In this case, the misfire judgement selection means 17 uses the second misfire judging means 16 when it is so judged that the ionic current i is proper in the operation region C and uses the first misfire judging means 15 when it is so judged that the ionic current i is not proper in the operation region C.

The processing operation according to the embodiment 2 of the present invention using the second misfire judging means 16 in the operation region C will now be described with reference to the flow chart of FIG. 5.

The constitution of the embodiment 2 of the invention is as shown in FIG. 1.

Figure 5:
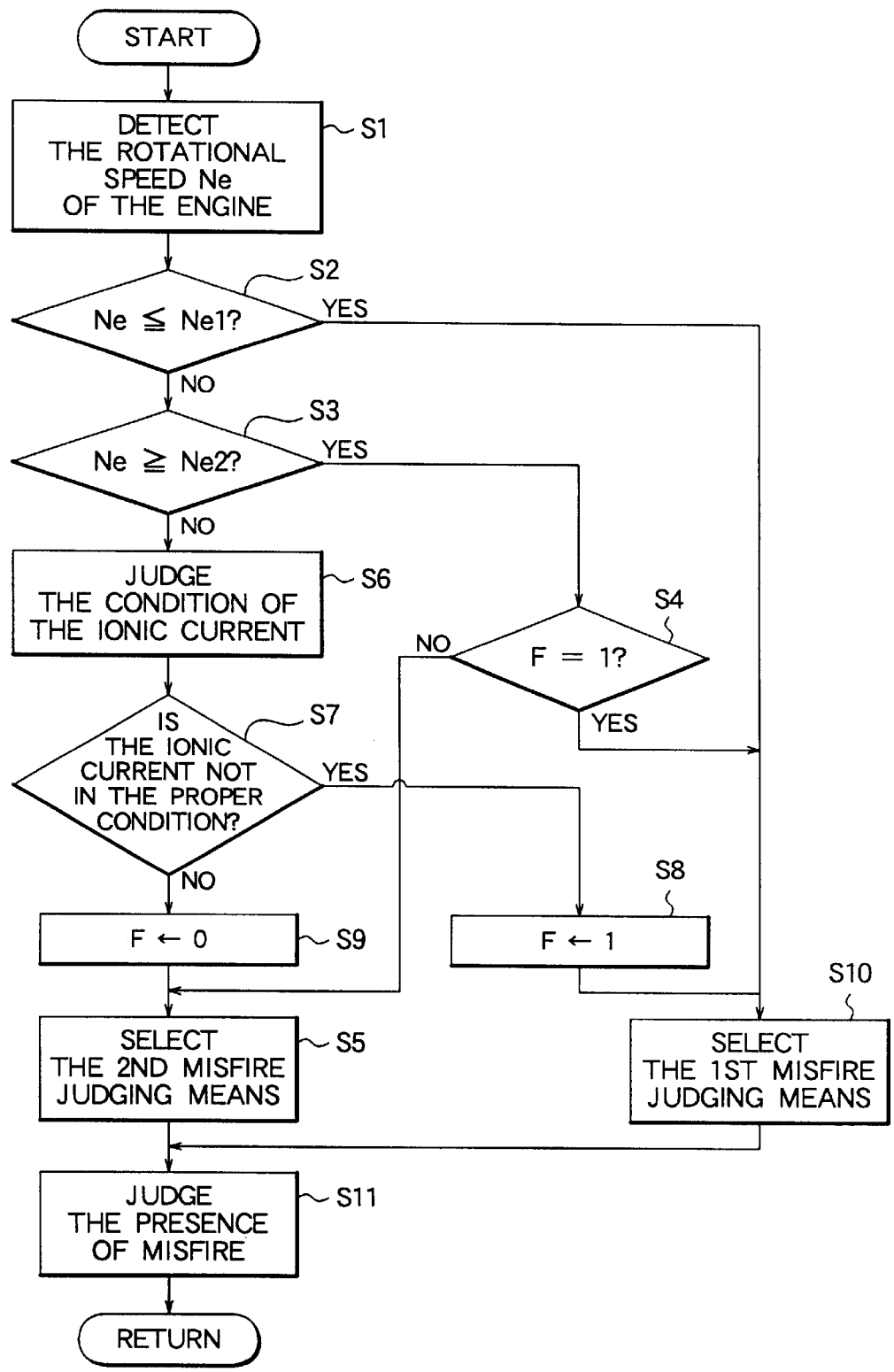
FIG. 5 is a flow chart illustrating the processing operation according to an embodiment 2 of the present invention.

In FIG. 5, the steps S1 to S11 are the same as those described above (see FIG. 4) and their description is not repeated here.

In this case, the misfire judgement selection means 17 selects the first misfire judging means 15 when it is judged at the step S2 that Ne≦Ne1 (operation region A), when it is judged at the step S3 that Ne≧Ne2 (operation region B) and at the step S4 that F=1 (ionic current is not proper), and when it is judged at the step S3 that Ne<Ne2 (operation region C) and at the step S7 that the ionic current is not proper (i.e., YES) (step S10).

The misfire judgement selection means 17 selects the second misfire judging means 16 when it is judged at the step S3 that Ne≧Ne2 (operation region B) and at the step S that F=0 (ionic current is proper), and when it is judged at the step S3 that Ne<Ne2 (operation region C) and at the step S7 that the ionic current is proper (i.e., YES) (step S5).

In this case, too, it is made possible to detect the misfire maintaining high reliability in all of the operation regions A to C. When the ionic current i is not proper, use of the second misfire judging means 16 is inhibited in the operation regions B and C, and, instead, the first misfire judging means 15 is used to prevent erroneous detection of the misfire.

When it is so constituted that the processing operation of the first misfire judging means 15 is inhibited while the second misfire judging means 16 is being used, then, the operation of the period ratio is suppressed to a minimum degree, making it possible to decrease the amount of operation in the ECU 10.

Embodiment 3.

In the above-mentioned embodiment 1, the improper condition of the ionic current i was judged based on the peak level Dp of the ionic current detection signal D. However, the improper condition of the ionic current i may be judged based on an integrated value of the ionic current detection signal D.

In this case, the ionic current condition judging means in the misfire judgement selection means 17 operates the integrated value of the ionic current detection signal D in the judging period T (see FIG. 3) in the operation region C, judges the ionic current i to be not in the proper condition when the integrated value is smaller than a predetermined value, and sets the flag F to "1".

Thus, when the integrated value of the ionic current detection signal D is operated, it is made possible to improve the reliability of the result of judgement of the ionic current condition compared with when the peak level Dp and the predetermined value Dr are compared with each other, though the amount of operation increases in the ECU 10.

Embodiment 4.

In the above-mentioned embodiment 3, the improper condition of the ionic current i was judged based on the ionic current detection signal D. However, the improper condition of the ionic current i may be judged based upon the first and second misfire judgement signals E1 and E2.

In this case, the ionic current condition judging means in the misfire judgement selection means 17 compares the first and second misfire judgement signals E1 and E2 in the operation region C, and judges the ionic current i to be not in the proper condition when they are not in agreement with each other.

In the operation region C, for example, when the first misfire judging means 15 renders the judgement of misfire and produces the misfire judgement signal E1 but when the second misfire judging means 16 does not render the judgement of misfire and does not produce the misfire judgement signal E2, then, the ionic current condition judging means judges the ionic current i to be not in the proper condition and sets the flag F to "1".

Usually, the output signal of the revolution sensor 1 is used for controlling the fuel injection and for controlling the ignition that are basic functions for controlling the engine, without requiring the improper condition to be taken into consideration. Therefore, precedence has been given to the result of judgement by the first misfire judging means 15 which is based on the rotational speed Ne of the engine.

When the first misfire judgement signal E1 is not in agreement with the second misfire judgement signal E2, therefore, use of the second misfire judging means 16 based on the ionic current detection signal D is inhibited.

Upon judging the ionic current condition based on the result of comparison of the first and second misfire judgement signals E1 and E2, as described above, it is made possible to judge the improper condition of the ionic current i through a simple processing operation maintaining high reliability.

What is claimed is:

1. A device for detecting misfire in an internal combustion engine comprising:

various sensors for detecting operation conditions of the internal combustion engine;

an operation region detection means for detecting an operation region of said internal combustion engine from said operation conditions;

a control parameter operation means for operating control parameters of said internal combustion engine based upon said operation conditions;

an ignition device for igniting said internal combustion engine relying upon said control parameters;

an ionic current detection unit for detecting an ionic current generated upon the ignition of said internal combustion engine;

a first misfire judging means for judging the misfire in said internal combustion engine based upon a change in a time of revolution data of said internal combustion engine included in said operation conditions;

a second misfire judging means for judging the misfire in said internal combustion engine based upon said ionic current; and a misfire judgement selection means for selectively using the first misfire judging means or the second misfire judging means depending upon said operation region.

2. A device for detecting the misfire in an internal combustion engine according to claim 1, wherein said operation region detection means detects at least the operation region divided into a plurality of regions based upon a revolution data of said internal combustion engine.

3. A device for detecting the misfire in an internal combustion engine according to claim 2, wherein said operation region detection means detects a first operation region where a rotational speed is lower than a first predetermined rotational speed corresponding to an idling rotational speed of said internal combustion engine, and the misfire judgement selection means uses said first misfire judging means in said first operation region.

4. A device for detecting the misfire in an internal combustion engine according to claim 2, wherein said operation region detection means detects a second operation region where the rotational speed is higher than a second predetermined rotational speed which is higher than said first predetermined rotational speed, and said misfire judgement selection means uses said second misfire judging means in said second operation region.

5. A device for detecting the misfire in an internal combustion engine according to claim 4, wherein:

said operation region detection means detects a third operation region lying between said first predetermined rotational speed and said second predetermined rotational speed; and wherein the misfire judgement selection means includes:

an ionic current condition judging means for judging whether the ionic current is in a proper condition or not in said third operation region; and the misfire judgement selection means uses said second misfire judging means in said second operation region when it is judged that the ionic current is in the proper condition in said third operation region, and uses said first misfire judging means in said second operation region when it is judged that the ionic current is not in the proper condition in said third operation region.

6. A device for detecting the misfire in an internal combustion engine according to claim 5, wherein said misfire judgement selection means uses said first misfire judging means in said third operation region.

7. A device for detecting the misfire in an internal combustion engine according to claim 5, wherein said misfire judgement selection means uses said second misfire judging means when it is judged that said ionic current is in the proper condition in said third operation region, and uses said first misfire judging means when it is judged that said ionic current is not in the proper condition in said third operation region.

8. A device for detecting the misfire in an internal combustion engine according to claim 5, wherein said ionic current condition judging means so judges that said ionic current is not in the proper condition when a peak level of the ionic current detected in said third operation region is lower than a predetermined value.

9. A device for detecting the misfire in an internal combustion engine according to claim 5, wherein said ionic current condition judging means so judges that said ionic current is not in the proper condition when an integrated value of the ionic current detected in said third operation region is smaller than a predetermined value.

10. A device for detecting the misfire in an internal combustion engine according to claim 5, wherein said ionic current condition judging means so judges that said ionic current is not in the proper condition when the results of judgement by said first and second misfire judging means in said third operation region are not in agreement with each other.

11. A device for detecting the misfire in an internal combustion engine according to claim 10, wherein said ionic current condition judging means so judges that said ionic current is not in the proper condition when said first misfire judging means renders the judgement of misfire in said third operation region but when said second misfire judging means does not render the judgement of misfire in said third operation region.

* * * * *